UNITED STATES PATENT OFFICE.

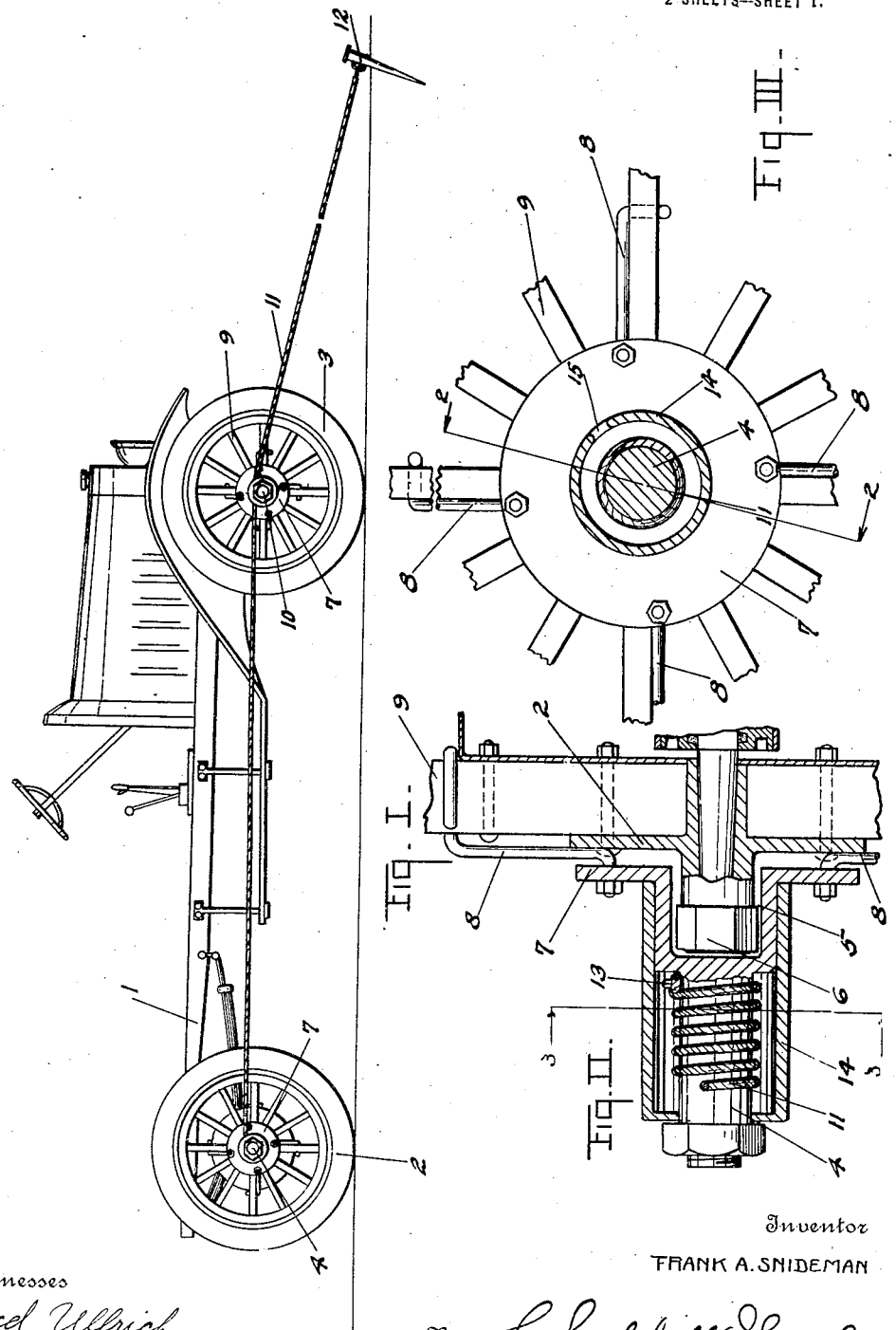

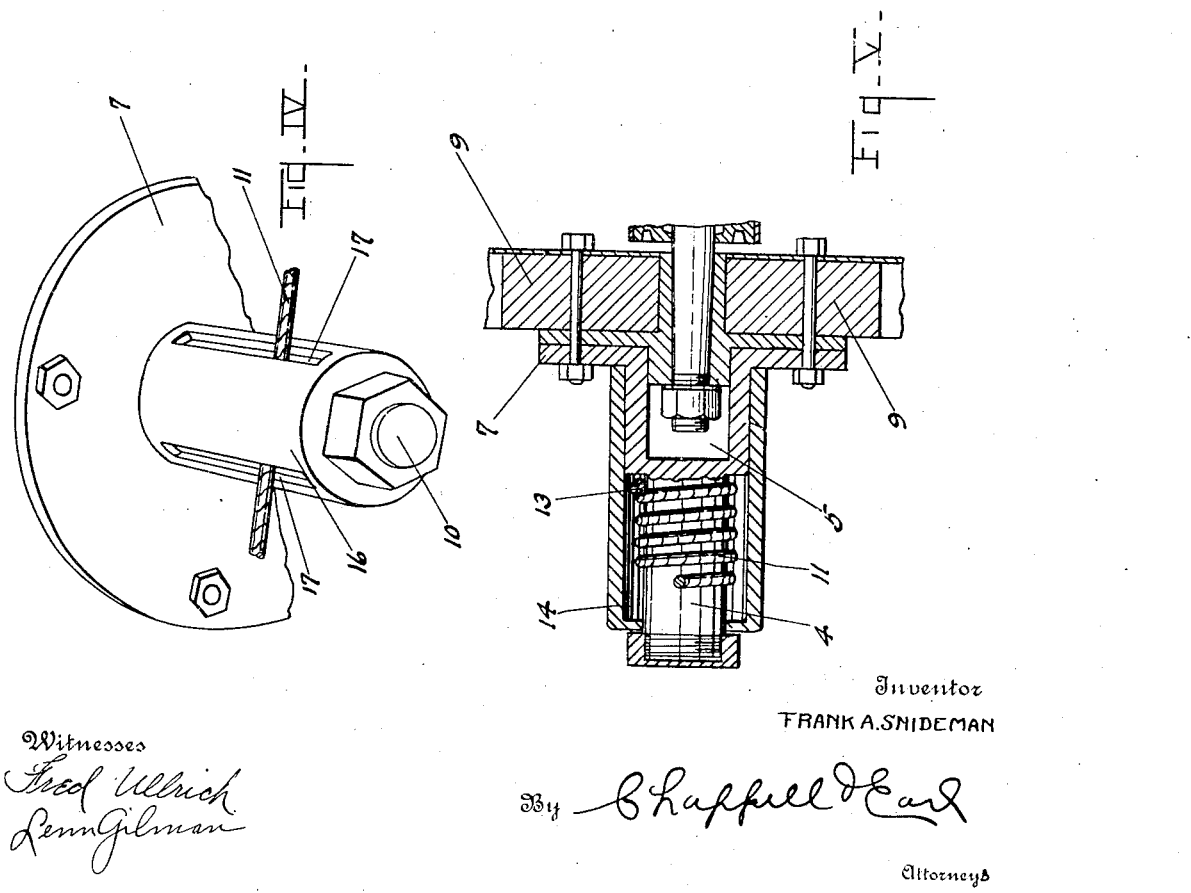

FRANK A. SNIDEMAN, OF GARY, INDIANA.

PULL-OUT DEVICE FOR MOTOR-VEHICLES.

1,340,349.  Specification of Letters Patent.  Patented May 18, 1920.

Application filed November 7, 1918. Serial No. 261,437.

*To all whom it may concern:*

Be it known that I, FRANK A. SNIDEMAN, a citizen of the United States, residing at Gary, county of Lake, State of Indiana, have invented certain new and useful Improvements in Pull-Out Devices for Motor-Vehicles, of which the following is a specification.

This invention relates to improvements in pull out devices for motor vehicles.

The main objects of this invention are:

First, to provide an improved pull out device for motor vehicles which may be quickly applied to motor vehicles of common structure.

Second, to provide an improved pull out device which also acts as a steering or guide means for the vehicle.

Third, to provide an improved pull out device for motor vehicles which is very efficient and at the same time simple and economical in structure.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side view of a motor vehicle, such as a truck, embodying the features of my invention, only parts of the vehicle being shown, and these mainly in conventional form.

Fig. II is an enlarged detail view of one of the driving wheels of the vehicle, the same being shown mainly in section on a line corresponding to line 2—2 of Fig. III.

Fig. III is a detail section on a line corresponding to line 3—3 of Fig. II.

Fig. IV is a perspective view of the front wheel.

Fig. V is a detail section corresponding to that of Fig. II of a modified embodiment of my invention.

In the drawing similar reference characters refer to similar parts throughout the several views, and the sectional views are taken looking in the direction of the little arrows at the ends of the section lines.

Referring to the drawing, 1 represents the chassis of a motor vehicle, 2 one of the rear driving wheels, and 3 one of the front steering wheels. These parts are, as stated, shown in conventional form as their details form no part of my present invention.

On the rear driving wheel I mount a winding spindle or drum 4 which is chambered at its inner end as at 5 to embrace the hub 6 of the wheel. The winding spindle is provided with a flange 7 at its inner end carrying clamps 8 which engage spokes 9 of the wheel, there being four of the clamps in the structure illustrated. On the front wheel is a similar spindle 10.

The cable 11 is provided with an anchor 12 adapted to be driven into the ground, but, of course, the cable might be attached to any suitable fixed object. The cable is secured to the spindle 4 at 13 to be wound thereon by the rotation of the wheel.

To insure the even winding of the cable upon the spindle I provide a winding guide or sleeve 14 which is rotatably mounted upon the spindle and provided with a longitudinal slot 15 through which the cable is disposed. The front spindle 10 is provided with a cable guide 16 having opposed slots 17 therein through which the cable is disposed.

With this arrangement a motor vehicle may be extricated from sand, mud, or other conditions where traction cannot be had with the driving wheels by its own power, and by providing the front wheel with the guide this may be done in safety and the vehicle guided substantially as desired. This is of advantage, both as a matter of safety and convenience.

I have not attempted to illustrate or describe various modifications and adaptations of my invention as I believe the disclosure made will enable those skilled in the art to which my invention relates to embody or adapt the same as various structural and operating conditions may render advisable.

Having thus described my invention, what I claim as new and desire to secure by Letters Patent, is:

1. The combination with a motor vehicle having a rear driving wheel and a front steering wheel, of spindles detachably secured to the wheels in alinement with their axes, an anchor cable secured to the rear spindle to be wound thereon, and guide sleeves rotatably mounted on said spindles, the rear guide sleeve having a longitudinal slot therein through which the cable is disposed, the sleeve on the front spindle having openings therein through which the cable is disposed.

2. The combination with a motor vehicle having a rear driving wheel and a front steering wheel, of spindles on said wheels disposed in alinement with their axes, an anchor cable secured to the rear spindle to be wound thereon, and a guide sleeve through which the cable is passed rotatably mounted on the front spindle.

3. The combination with a motor vehicle having a rear driving wheel and a front steering wheel, of a spindle on the rear driving wheel disposed in alinement with its rear axis, a cable guide secured to the hub of the steering wheel, and an anchor cable secured to the spindle to be wound thereon and disposed through the guide carried by the hub of the front wheel.

4. The combination with a motor vehicle having a rear driving wheel and a front steering wheel, a winding spindle secured to the driving wheel, an anchor cable secured to the spindle to be wound thereon, and a guide for said cable connected to the front steering wheel so that such steering wheel is guided by the anchor cable.

In witness whereof I have hereunto set my hand and seal in the presence of two witnesses.

FRANK A. SNIDEMAN. [L. S.]

Witnesses:
J. N. MULEN,
WEBB CLINE.